(12) United States Patent
Thaliath et al.

(10) Patent No.: US 12,369,056 B2
(45) Date of Patent: Jul. 22, 2025

(54) METHODS AND SYSTEMS FOR ENABLING CI-CD IN WIRELESS NETWORK

(71) Applicant: Samsung Electronics Co., Ltd., Suwon-si (KR)

(72) Inventors: Joseph Thaliath, Bangalore (IN); Deepanshu Gautam, Bangalore (IN); Avinash Bhat, Bangalore (IN); Sukhdeep Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 17/729,629

(22) Filed: Apr. 26, 2022

(65) Prior Publication Data

US 2022/0330063 A1 Oct. 13, 2022

Related U.S. Application Data

(63) Continuation of application No. PCT/KR2022/004658, filed on Mar. 31, 2022.

(30) Foreign Application Priority Data

Mar. 31, 2021 (IN) .............................. 202141014717
Mar. 4, 2022 (IN) .............................. 2021 41014717

(51) Int. Cl.
*H04W 24/08* (2009.01)
*H04W 24/02* (2009.01)

(52) U.S. Cl.
CPC ........... *H04W 24/08* (2013.01); *H04W 24/02* (2013.01)

(58) Field of Classification Search
CPC .............................. H04W 24/08; H04W 24/02
(Continued)

(56) References Cited

U.S. PATENT DOCUMENTS 10,303,586 B1 5/2019 Falko
10,467,121 B2 11/2019 Natari
(Continued)

FOREIGN PATENT DOCUMENTS

CN 109873730 A 6/2019
KR 10-2019-0142707 A 12/2019

OTHER PUBLICATIONS

NGMN, 'NGMN Continuous Delivery in Telecommunication Network Environments', S5-203025, 3GPP TSG SA5 Meeting #131-e, May 14, 2020.
(Continued)

*Primary Examiner* — Sulaiman Nooristany
(74) *Attorney, Agent, or Firm* — Jefferson IP Law, LLP

(57) ABSTRACT

The disclosure relates to a 5G or 6G communication system for supporting a higher data transmission rate. A method performed by an operation, administration and maintenance (OAM) controller for facilitating continuous integration and continuous deployment (CI-CD) in a wireless communication system is provided. The method includes transmitting, to a network slice management service (NSMS) consumer, a request to trigger a test upgraded technique for a network function (NF), wherein the request to trigger the test upgraded technique comprises at least one parameter indicated as part of a test network slice information object class (IOC); receiving, from the NSMS consumer, a trigger test response based on the request to trigger the test upgraded technique; and configuring at least one user equipment (UE) with at least one test slice identifier based on the trigger test response.

20 Claims, 12 Drawing Sheets

(58) Field of Classification Search
USPC .................................................. 370/241.1
See application file for complete search history.

(56) References Cited

U.S. PATENT DOCUMENTS

| | | | |
|---|---|---|---|
| 10,581,717 B2 | 3/2020 | Tejaprakash et al. | |
| 10,609,530 B1 | 3/2020 | Patil et al. | |
| 10,880,173 B2 | 12/2020 | Seenappa et al. | |
| 2019/0065357 A1 | 2/2019 | Brafman et al. | |
| 2019/0223055 A1* | 7/2019 | Bor Yaliniz | H04L 41/0896 |
| 2020/0021487 A1* | 1/2020 | Yao | H04L 41/02 |
| 2020/0145833 A1* | 5/2020 | Thakolsri | H04W 24/02 |
| 2020/0145883 A1* | 5/2020 | Lin | H04L 47/25 |
| 2020/0154292 A1* | 5/2020 | Bor-Yaliniz | H04L 41/40 |
| 2020/0314615 A1 | 10/2020 | Patil et al. | |
| 2021/0105638 A1* | 4/2021 | Al-Kanani | H04L 41/142 |
| 2021/0250251 A1* | 8/2021 | Fan | H04W 24/02 |
| 2022/0201447 A1* | 6/2022 | Asawa | H04W 24/02 |
| 2023/0189006 A1* | 6/2023 | Chou | H04W 16/10 370/328 |
| 2023/0246900 A1* | 8/2023 | Zhang | H04L 41/342 709/223 |

OTHER PUBLICATIONS

Lenovo, 'Discussion on the need for CI-CD', S5-211338, 3GPP TSG SA5 Meeting #135-e, Jan. 15, 2021.
International Search Report and Written Opinion dated Jun. 24, 2022, issued in International Patent Application No. PCT/KR2022/004658.
Indian Office Action dated Oct. 18, 2022, issued in Indian Patent Application No. 202141014717.
Huawei S5, Add procedure of NSI performance assurance, 3GPP TSG-SA5 Meeting#125Adhoc, S5-194236, Sapporo, Japan, Jun. 18, 2019.
European Office Action dated Jul. 30, 2024, issued in European Application No. 22781672.5.
3rd Generation Partnership Project Technical Specification Group Services and System Aspects; Management and orchestration; 5G Network Resource Model (NRM); Stage 2 and stage 3 (Release 16), 3GPP TS 28.541 v16.7.0, Dec. 16, 2020.
3rd Generation Partnership Project; Technical Specification Group Services and System Aspects; Management and orchestration; Provisioning; (Release 16), 3GPP TS 28.531 v16.8.0, Dec. 16, 2020.

* cited by examiner

METHODS AND SYSTEMS FOR ENABLING CI-CD IN WIRELESS NETWORK

CROSS-REFERENCE TO RELATED APPLICATION(S)

This application is a continuation application, claiming priority under § 365(c), of an International application No. PCT/KR2022/004658, filed on Mar. 31, 2022, which is based on and claims the benefit of an Indian Provisional patent application number 202141014717, filed on Mar. 31, 2021, in the Indian Patent Office, and of an Indian Non-Provisional patent application number 202141014717, filed on Mar. 4, 2022, in the Indian Patent Office, the disclosure of each of which is incorporated by reference herein in its entirety.

TECHNICAL FIELD

The disclosure relates to Fifth Generation (5G) networks. More particularly, the disclosure relates to methods and systems for facilitating continuous integration and continuous deployment (CI-CD) in the 5G networks.

BACKGROUND 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum, and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The Network Slicing feature in 5G provides telecom operators the capability to support multiple logical networks on a common physical network infrastructure. Each of these logical networks will cater to different services and might have different operational requirements spanning across domains.

Cloud Native based platform and tools which are widely used in the information technology (IT) world has inbuilt frameworks for agile and flexible deployment. These platforms are increasingly becoming the de-facto choice for original equipment manufacturers (OEMs) to develop the 5G Telecom Products. This highlights the importance of bringing many Cloud Native benefits like CI-CD that are important for automation and flexibility of the 5G networks.

The CI-CD automates and integrates the development phase, testing phase and deployment phase to improve feature velocity. Facilitating CI-CD in the 5G networks which includes the most transaction-intensive and time-sensitive Radio Access Network (RAN) network functions is still a challenge. Dynamic software upgrades and live testing of 5G software components in production environment without service interruptions remains the main challenge that need to be solved for facilitating CI-CD in 5G networks. The main technical problems that exists in the current 5G networks for facilitating CI-CD are as follows:
1. Inevitable service interruption,
   a) No existing mechanisms defined to perform upgrade of RAN SW components without service interruption to the UEs.
2. Cumbersome Live testing procedures:
   a) No existing mechanism to automatically select UE for testing purpose.
   b) No existing mechanism to automatically select deployment location of the upgraded software for testing purpose.
   c) No existing mechanism to deploy test UEs in production environment for testing upgraded software.
   d) No existing mechanisms to test different configuration parameters without impacting UEs not used for testing the upgraded software.

The above information is presented as background information only to assist with an understanding of the disclosure. No determination has been made, and no assertion is made, as to whether any of the above might be applicable as prior art with regard to the disclosure.

Objects

Aspects of the disclosure are to address at least the above-mentioned problems and/or disadvantages and to provide at least the advantages described below. Accordingly, an aspect of the disclosure is to provide methods and systems for facilitating continuous integration and continuous deployment (CI-CD) in Fifth Generation (5G) networks, wherein a new network slice Information Object Class (IOC) is modelled exclusively for testing purpose in a 5G slice Network Resource Model (NRM).

Another aspect of the disclosure is to provide creation of a new instance of a test slice, wherein the test slice is triggered by an upgrade request.

Another aspect of the disclosure is to dynamically modifying a test slice instance to include new features and additional upgraded network features.

Another aspect of the disclosure is to provision UEs with new test slices.

Another aspect of the disclosure is to provide selection of the deployment location of the upgraded software for testing.

Additional aspects will be set forth in part in the description which follows and, in part, will be apparent from the description, or may be learned by practice of the presented embodiments.

SUMMARY

In accordance with an aspect of the disclosure, a method performed by an operation, administration and maintenance (OAM) controller for facilitating continuous integration and continuous deployment (CI-CD) in a wireless communication system is provided. The method includes transmitting, to a network slice management service (NSMS) consumer, a request to trigger a test upgraded technique for a network function (NF), wherein the request to trigger the test upgraded technique comprises at least one parameter indicated as part of a test network slice information object class (IOC); receiving, from the NSMS consumer, a trigger test response based on the request to trigger the test upgraded technique; and configuring at least one user equipment (UE) with at least one test slice identifier based on the trigger test response.

In accordance with another aspect of the disclosure, a method performed by an NSMS consumer, for facilitating CI-CD in a wireless communication system is provided. The method includes receiving, from an OAM controller, a request to trigger a test upgraded technique for an NF, wherein the request to trigger the test upgraded technique comprises at least one parameter indicated as part of a test network slice IOC; generating at least one test slice identifier based on the request to trigger the test upgraded technique; and transmitting, to the OAM controller, a trigger test response including the at least one test slice identifier based on the request to trigger the test upgraded technique, wherein at least one UE is configured to with the at least one test slice identifier.

In accordance with another aspect of the disclosure, an OAM controller for facilitating CI-CD in a wireless communication system is provided. The OAM controller includes a transceiver and a processor. The processor is configured to transmit, to an NSMS consumer via the transceiver, a request to trigger a test upgraded technique for an NF, wherein the request to trigger the test upgraded technique comprises at least one parameter indicated as part of a test network slice IOC, receive, from the NSMS consumer via the transceiver, a trigger test response based on the request to trigger the test upgraded technique, and configure at least one UE with at least one test slice identifier based on the trigger test response.

In accordance with another aspect of the disclosure, an NSMS consumer, for facilitating CI-CD in a wireless communication system is provided. The NSMS consumer comprising a transceiver and a processor. The processor is configured to receive, from an OAM controller, a request to trigger a test upgraded technique for an NF, wherein the request to trigger the test upgraded technique comprises at least one parameter indicated as part of a test network slice IOC, generate at least one test slice identifier based on the request to trigger the test upgraded technique, and transmit, to the OAM controller via the transceiver, a trigger test response including the at least one test slice identifier based on the request to trigger the test upgraded technique, wherein at least one UE is configured to with the at least one test slice identifier.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
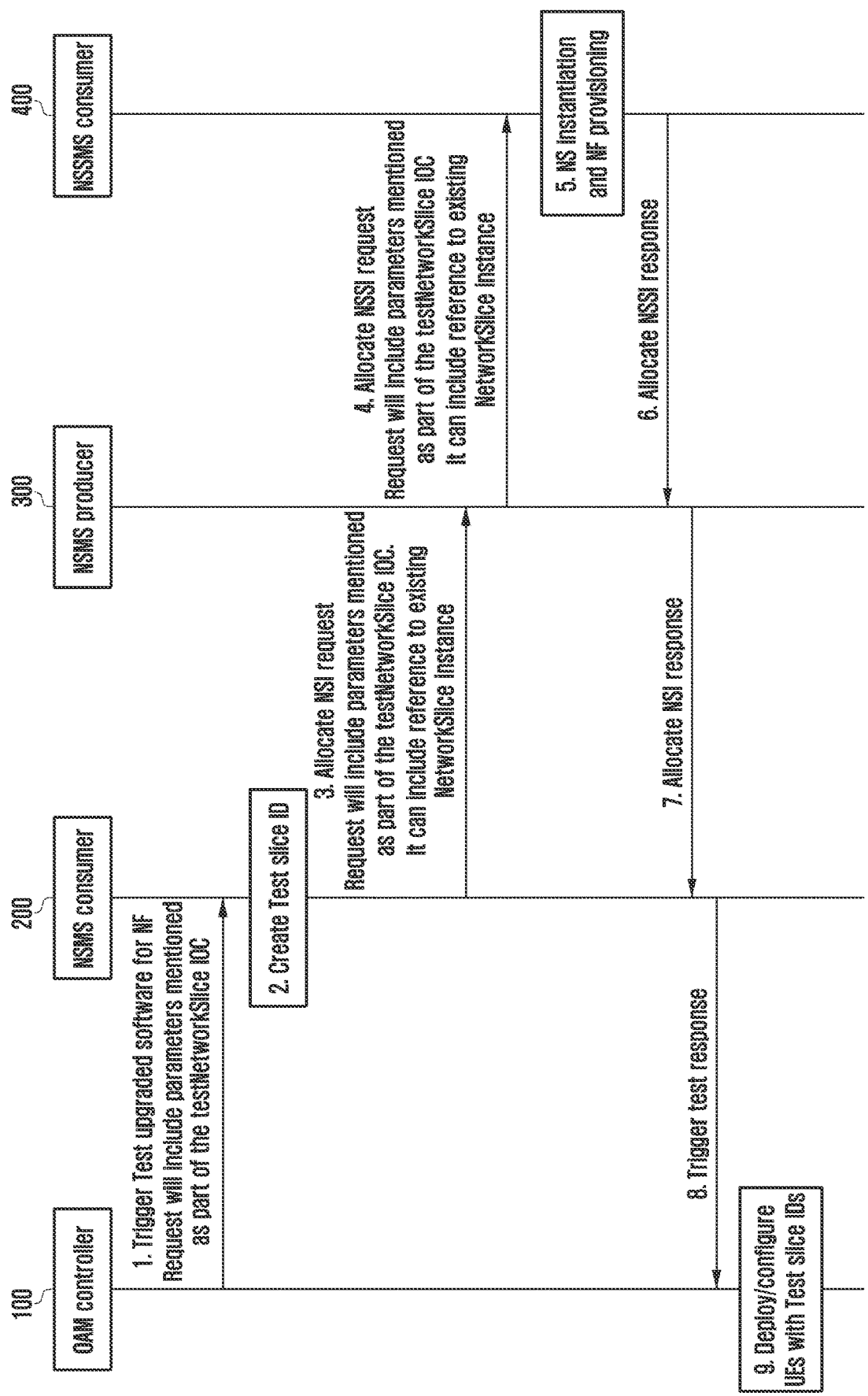
FIG. 1 depicts a sequence diagram illustrating a process of allocating a network slice instance (NSI) during a slice instantiation procedure, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve methods for facilitating continuous integration and continuous deployment (CI-CD) in Fifth Generation (5G) networks. The method includes sending, by an Operations, Administration and Maintenance (OAM) controller, a request to trigger test upgraded technique for a network function (NF) to a Network Slice Management Service (NSMS) consumer. The request includes a parameter indicated as part of a test network slice Information Object Class (IOC). The parameter includes test slice information, managed function information test duration, a pre-emption indicator, and a use prediction and procedures to be tested. Further, the method includes receiving, by the OAM controller, a trigger test response from the NSMS consumer based on the request to trigger test upgraded technique. Further, the method includes configuring, by the OAM controller, at least one user equipment (UE) with a test slice identifier based on the trigger test response.

Referring now to the drawings, and more particularly to FIGS. 1 through 12, where similar reference characters denote corresponding features consistently throughout the figures, there are shown at least one embodiment.

Based on the proposed method, the ability to test upgraded network nodes in a live network will increase the agility of 5G networks. The network slicing can be used to assist in live testing. A test slice can be created/deployed, consisting the upgraded network functions, for testing purpose. The basic principles of the live testing should be:

1. Test-slice creation with appropriate information e.g., test cases, test duration, target network nodes etc.
2. Automatic UE selection: The UE to be assigned to the test network slice can be selected minimizing the impact of testing; e.g., the UEs can be selected based on the location of the network nodes where the upgraded software is deployed. This can be based on the current load conditions of the Network nodes. UEs can also be selected based on the UE characteristics like UE mobility and UE capabilities like Dual connectivity.
3. Deployment location selection for the upgraded node: The location of the node can be selected minimizing the impact of testing; e.g., the location of the Networks nodes that needs to be upgraded and tested can be selected based on load conditions of the Network nodes at a given time. The location of the node can also be based on the availability of UEs for testing in a given location.
4. Feature testing: It should be possible to select a set of features, among the list of all features, to be tested. For example, if Network function next generation NodeB (gNB) centralized unit (CU) is upgraded with features X, Y, Z but feature Y has dependency on the next generation (NG) interface with 5G core (5GC). In this case, only feature X, Z should be tested till the 5GC is also upgraded with feature Y.
5. Drone UE: The test UE (operator controlled) can be created and deployed in the target location.

X.1.2 Requirements
1. REQ-CICD-FUN-1: The third generation partnership project (3GPP) Management system shall be able to support testing the upgraded software in the live network.

2. REQ-CICD-FUN-1: The 3GPP Management system shall be able to support creating/deploying a slice for testing the upgraded network functions in the live network.
3. REQ-CICD-FUN-1: The 3GPP Management system shall be able to support selecting appropriate UE(s) to be assigned to the test slice minimizing the service impacts, if any.
4. REQ-CICD-FUN-1: The 3GPP Management system shall be able to support selecting appropriate location for the upgrade network functions deployment minimizing the service impacts, if any.
5. REQ-CICD-FUN-1: The 3GPP Management system shall be able to support testing partial feature testing of the upgraded network functions.

Based on the proposed method, a new network slice IOC is modelled exclusively for testing purpose in the 5G slice Network Resource Model (NRM). The method can reuse existing NetworkSlice IOC. An optional testSliceInfo informational element for testing purpose can be added. The method can create a new testNetworkSlice IOC.

Based on the proposed method, the CI-CD mechanism will result in expedite network deployments. The CI-CD mechanism used in information technology (IT) domains can also be achieved in telecom domain using the proposed method. The proposed method will allow operators to test new features and bug fixes directly in production environment with no service impact.

FIG. 1 depicts a sequence diagram illustrating a process of allocating NSI during slice instantiation procedure according to an embodiment of the disclosure.

Referring to FIG. 1, at operation 1, an OAM controller (100) triggers test upgraded software for an NF, wherein a request may include parameters mentioned as part of the testNetworkSlice IOC. At operation 2, the NSMS consumer (200) creates the test slice identifier (ID) and provides the allocate NS request to the NSMS producer (300) at operation 3. The request will include parameters mentioned as part of the testNetworkSlice IOC. It can include a reference to existing NetworkSlice instance. At operation 4, the NSMS producer (300) sends the allocate network slice subnet instance (NSSI) request to the NSSMS consumer (400), where the request will include parameters mentioned as part of the testNetworkSlice IOC. It can include a reference to existing NetworkSlice instance. At operation 5, the NSSMS consumer (400) instantiates NS and provisions NF. At operation 6, the NSSMS consumer (400) sends the allocation NSSI response to the NSMS producer (300), which sends the allocate NSI response to the to the NSMS consumer (200) at operation 7. At operation 8, the NSMS consumer (200) sends the trigger test response to the OAM controller (100). At operation 9, the OAM controller (100) deploys/configures UEs (500) (as shown in the FIG. 11) with slice IDs.

Figure 2:
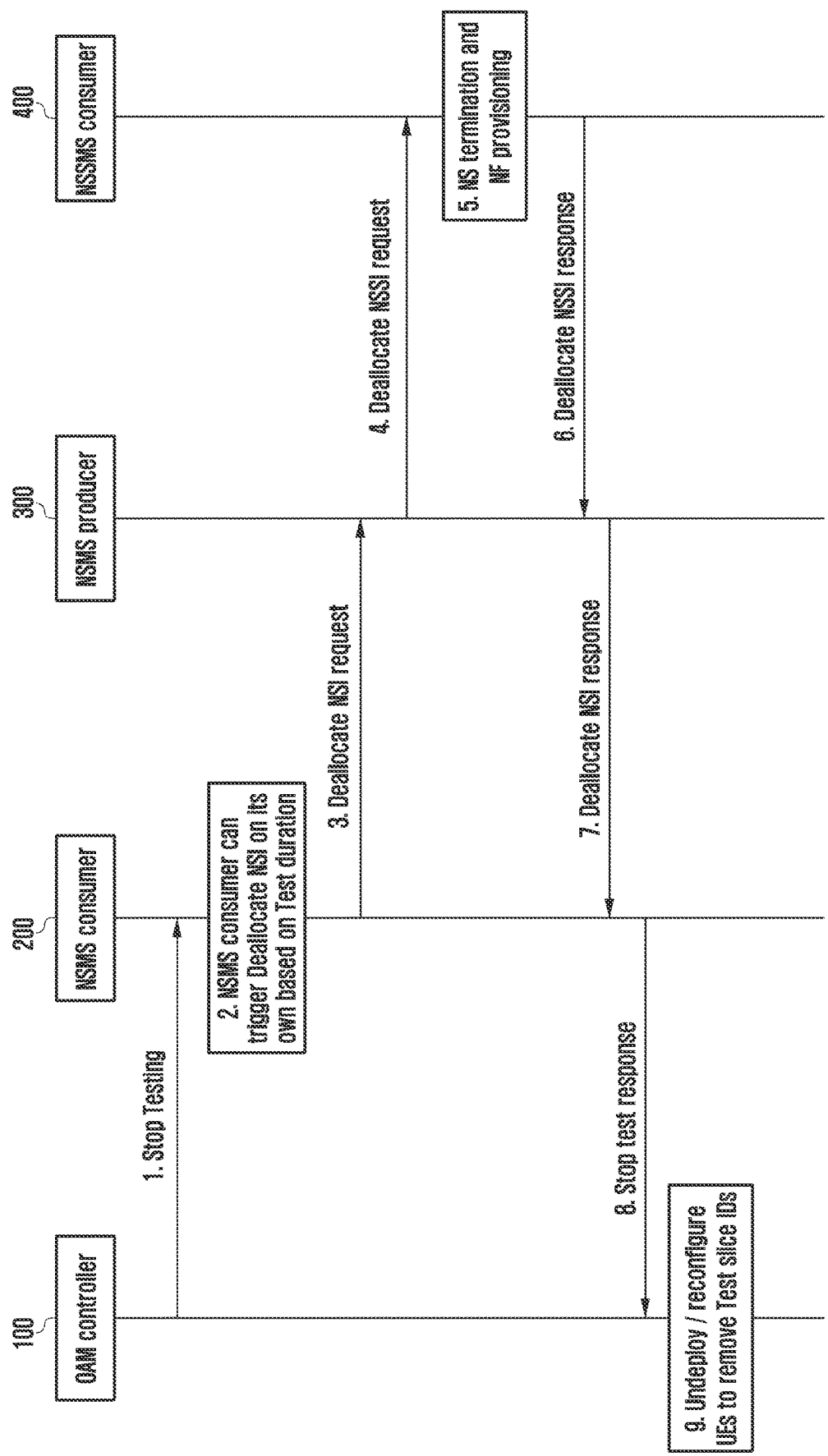
FIG. 2 depicts a sequence diagram illustrating a process of de-allocating NSI during a slice termination procedure, according to an embodiment of the disclosure.

FIG. 2 depicts a sequence diagram illustrating the process of deallocating NSI during a slice termination procedure according to an embodiment of the disclosure.

Referring to FIG. 2, at operation 1, an OAM controller (100) (e.g., software upgrade controller or the like) sends a message to stop testing to an NSMS consumer (200). At operation 2, the NSMS consumer (200) triggers deallocation NSI on its own based on the test duration. At operation 3, the NSMS consumer (200) sends the deallocate NSI request to the NSMS producer (300). At operation 4, the NSMS producer (300) sends the deallocate NSSI request to the NSSMS consumer (400). At operation 5, the NSSMS consumer (400) terminates NS and NF provisioning. At operation 6, the NSSMS consumer (400) sends the deallocate NSSI response to the NSMS producer (300). At operation 7, the NSMS producer (300) sends the deallocate NSI response to the NSMS consumer (200). At operation 8, the NSMS consumer (200) sends the stop test response to the OAM controller (100). At operation 9, OAM controller (100) undeploys/reconfigures the UEs (500) to remove the test slice IDs.

Figure 3:
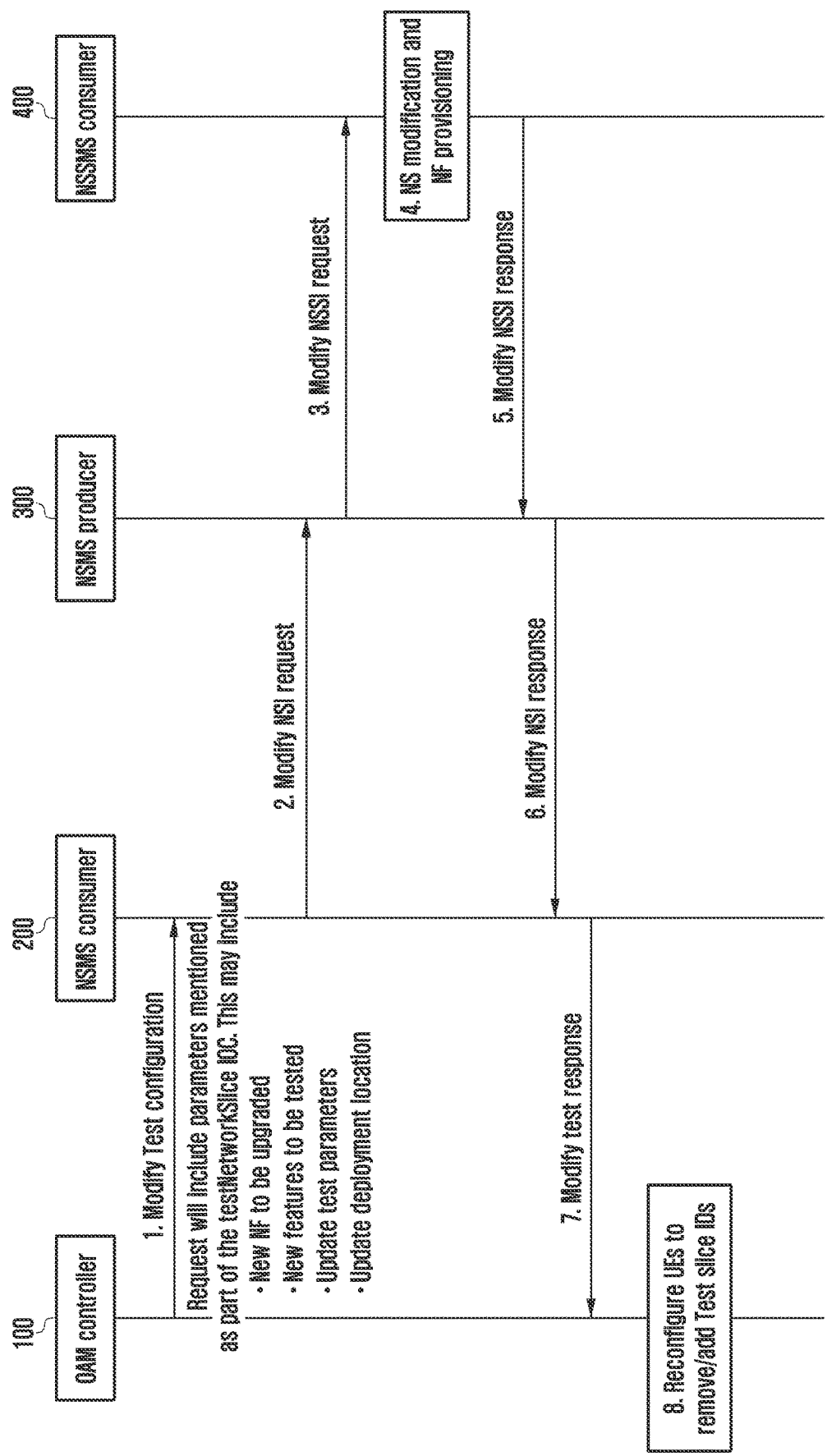
FIG. 3 depicts a sequence diagram illustrating a process of modifying NSI during a slice modification procedure, according to an embodiment of the disclosure.

FIG. 3 depicts a sequence diagram illustrating the process of modifying NSI during a slice modification procedure according to an embodiment of the disclosure.

Referring to FIG. 3, at operation 1, an OAM controller (100) sends a modify test configuration message to an NSMS consumer (200). The request message will include parameters mentioned as part of the testNetworkSlice IOC. This may include new NF to be upgraded, new features to be tested, update test parameters, update deployment location, and so on. At operation 2, the NSMS consumer (200) sends the modify NSI request to the NSMS producer (300). At operation 3, the NSMS producer (300) sends the modify NSSI request to the NSSMS consumer (400). At operation 4, the NSSMS consumer (400) modifies the NS and provisions the NF. At operation 5, the NSSMS consumer (400) sends the modify NSSI response to the NSMS producer (300). At operation 6, the NSMS producer (300) sends the modify NSI response to the NSMS consumer (200). At operation 7, the NSMS consumer (200) sends the modify test response to the OAM controller (100). At operation 8, the OAM controller (100) reconfigures the UEs (500) to the remover/add test slice IDs.

Figure 4:
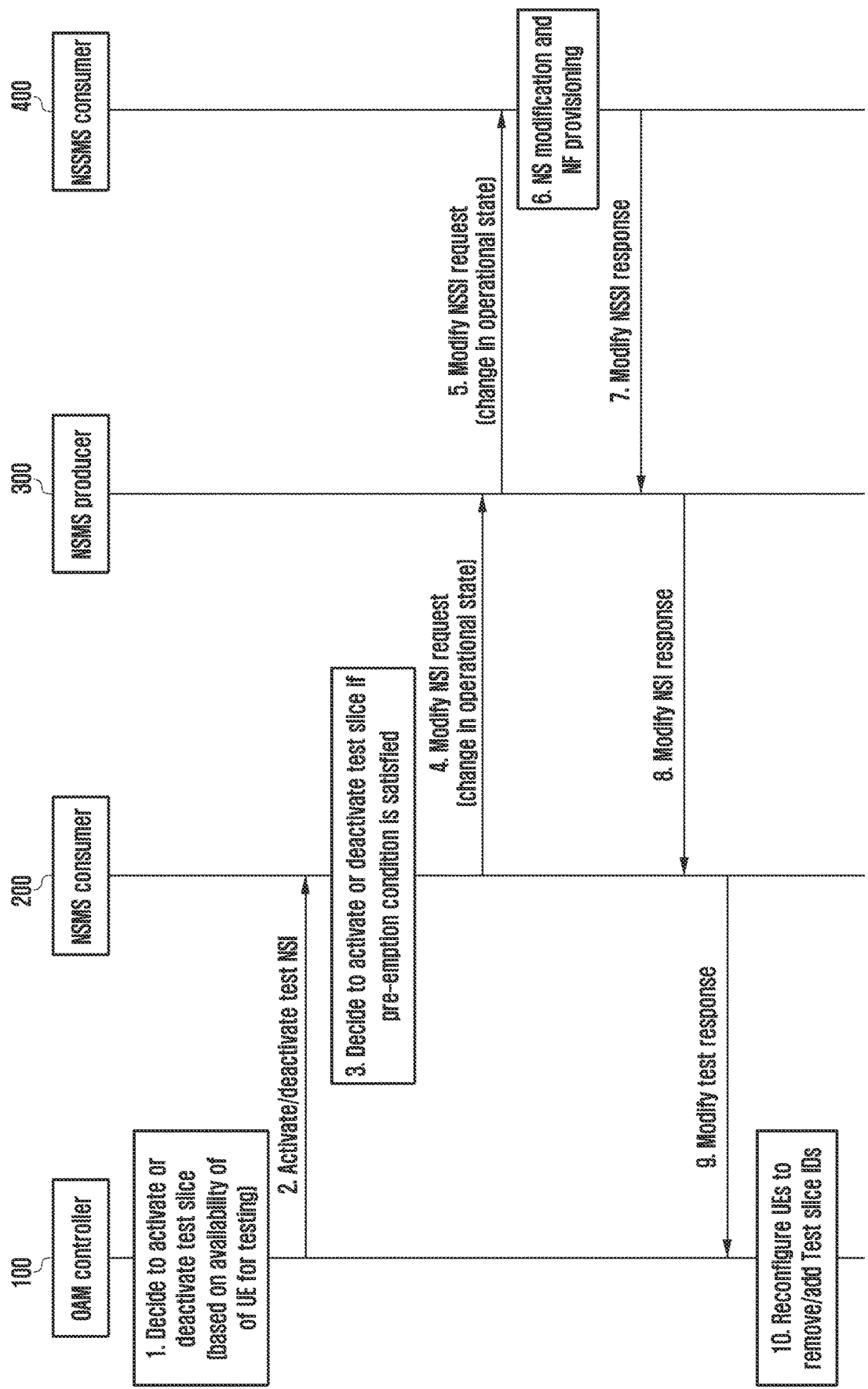
FIG. 4 depicts a sequence diagram illustrating a process of modifying NSI during a slice activation/deactivation procedure, according to an embodiment of the disclosure.

FIG. 4 depicts a sequence diagram illustrating a process of modifying an NSI during a slice activation/deactivation procedure according to an embodiment of the disclosure.

Referring to FIG. 4, at operation 1, an OAM controller (100) decides to activate or deactivate the test slice (which can be based on availability of a UE (500) for testing). At operation 2, the OAM controller (100) sends the activate/deactivate test NSI request to the NSMS consumer (200). At operation 3, the NSMS consumer (200) decides to activate/deactivate the test slice if the pre-emption condition has been satisfied. At operation 4, the NSMS consumer (200) sends the modify NSI request (change in operation state) to the NSMS producer (300). At operation 5, the NSMS producer (300) sends the modify NSSI request (change in operational state) to the NSSMS consumer (400). At operation 6, the NSSMS consumer (400) modifies the NS and NF provisioning. At operation 7, the NSSMS consumer (400) sends the modify NSSI response to the NSMS producer (300). At operation 8, the NSMS producer (300) sends the modify NSI response to the NSMS consumer (200). At operation 9, the NSMS consumer (200) sends the modify test response to the OAM controller (100). At operation 10, the OAM controller (100) reconfigures the UEs (500) to remove/add test slice IDs.

The proposed method can provide a better CI/CD mechanisms which will result in expedite network deployments. The proposed method can be used to achieve CI/CD mechanisms used in IT domains in telecom domain. The proposed method allows the operators to test new features and bug fixes directly in a production environment with no service impact.

Figure 5:
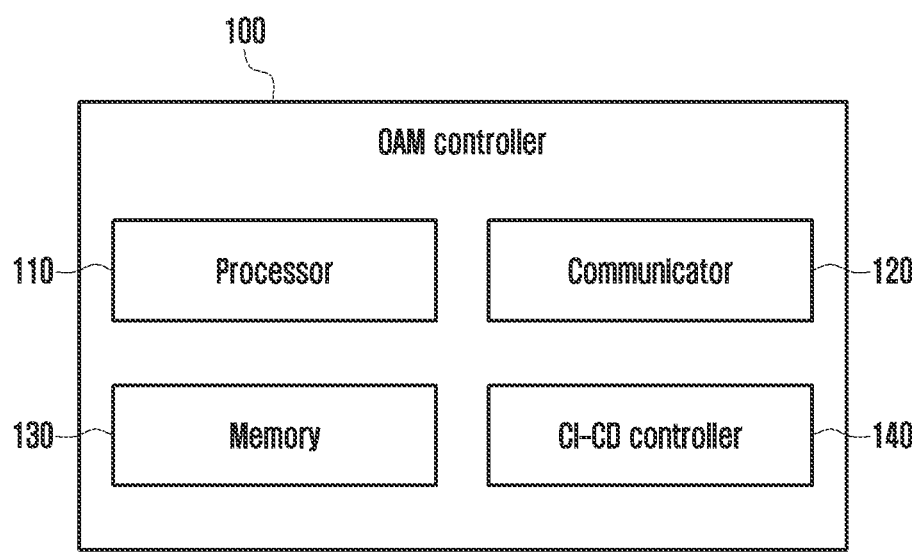
FIG. 5 shows various hardware components of an Operations, Administration and Maintenance (OAM) controller, according to an embodiment of the disclosure.

FIG. 5 shows various hardware components of an OAM controller (100), according to an embodiment of the disclosure.

Referring to FIG. 5, in an embodiment, an OAM controller (100) includes a processor (110), a communicator (120), a memory (130) and a CI-CD controller (140). The processor (110) is coupled with the communicator (120), the memory (130), and the CI-CD controller (140).

The CI-CD controller (140) is configured to send the request to trigger test upgraded technique for the NF to the NSMS consumer (200). The request includes the parameter indicated as part of the test network slice IOC. The parameter can be, for example, but not limited to a test slice information, a managed function information test duration, a pre-emption indicator, and a use prediction and procedures to be tested. The request to trigger test upgraded technique for the NF to the NSMS consumer (200) is based on the UE capability required for the testing the feature, UE characteristic, and trigger deployment of UEs (500) configured with the test slice created to test the OAM technique in the geographical location. The request to trigger test upgraded technique for the NF to the NSMS consumer (200) is used for testing purpose in the 5G slice NRM.

Based on the request to trigger test upgraded technique, the CI-CD controller (140) is configured to receive a trigger test response from the NSMS consumer (200). Based on the trigger test response, the CI-CD controller (140) configures the UE (500) with the test slice identifier. The UE (500) with the test slice identifier is configured based on based on the availability of radio and cloud resources, availability of the UE (500), and an operator defined restriction. The UE (500) is selected based on the location of the network node in which the OAM technique is executed, the load condition of the network node, the UE characteristics and a UE capability.

Further, the CI-CD controller (140) is configured to send the request to stop testing to the NSMS consumer (200). Based on the request to stop testing, the CI-CD controller (140) is configured to receive the stop test response from the NSMS consumer (200). Further, the CI-CD controller (140) reconfigures the UE (500) to remove the test slice ID.

Further, the CI-CD controller (140) is configured to send the request to modify test configuration to the NSMS consumer (200). The request includes the parameter indicated as part of the test Network slice IOC. The parameter can be, for example, but not limited to the new NF to be upgraded, the new features to be tested, the update test parameters, and the update deployment location. Further, the CI-CD controller (140) is configured to receive the modify test response from the NSMS consumer (200) based on the request to modify test configuration. Based on the modify test response, the CI-CD controller (140) reconfigures the UE (500) to remove the test slice ID or add the test slice ID.

Further, the CI-CD controller (140) is configured to determine whether test slice is activated or deactivated based on an availability of the UE (500) for testing. Based on the determination, the CI-CD controller (140) is configured to send the request to one of activate test NSI and deactivate test NSI to the NSMS consumer (200). Based on the request, the CI-CD controller (140) is configured to receive the modify test response from the NSMS consumer (200). Further, the CI-CD controller (140) is configured to reconfigure the UE (500) to remove the test slice ID or add the test slice ID based on the modify test response.

The CI-CD controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of erasable programmable read only memories (EPROMs) or electrically erasable programmable ROMs (EEPROMs). In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be an ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 5 shows various hardware components of the OAM controller (100) but it is to be understood that other embodiments are not limited thereon. In other embodiments, the OAM controller (100) may include less or more number of components. Further, the labels or names of the components are used only for illustrative purpose and does not limit the scope of the disclosure. One or more components can be combined together to perform same or substantially similar function in the OAM controller (100).

FIG. 6 shows various hardware components of an NSMS consumer (200), according to an embodiment of the disclosure.

Figure 6:
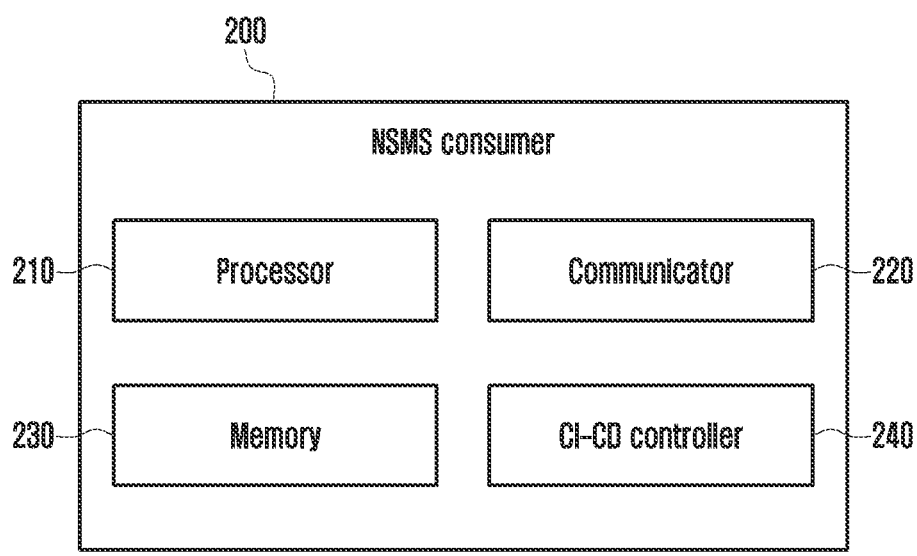
FIG. 6 shows various hardware components of a Network Slice Management Service (NSMS) consumer, according to an embodiment of the disclosure.

Referring to FIG. 6, in an embodiment, an NSMS consumer (200) includes a processor (210), a communicator (220), a memory (230) and a CI-CD controller (240). The processor (210) is coupled with the communicator (220), the memory (230), and the CI-CD controller (240).

The CI-CD controller (240) is configured to receive the request to trigger test upgraded technique for the NF from the OAM controller (100). The request includes the parameter indicated as part of the test network slice IOC. Based on the request, the CI-CD controller (240) is configured to create the test slice identifier. Based on the created test slice identifier, the CI-CD controller (240) is configured to allocate the NSI request to the NSMS producer (300). Further, the CI-CD controller (240) is configured to receive the NSI response from the NSMS producer (300) based on the NSI request.

Further, the CI-CD controller (240) is configured to receive the request to stop testing from the OAM controller (100) and trigger de-allocating NSI based on the test duration. Further, the CI-CD controller (240) is configured to receive the request to activate test NSI and deactivate test NSI from the OAM controller (100) and determine to activate or deactivate test slice if pre-emption condition is satisfied.

The CI-CD controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be an ML model based controller and AI model based controller. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 5 shows various hardware components of the NSMS consumer (200) but it is to be understood that other embodiments are not limited thereon. In other embodiments, the NSMS consumer (200) may include less or more number of components. Further, the labels or names of the components are used only for illustrative purpose and does not limit the scope of the disclosure. One or more components can be combined together to perform same or substantially similar function in the NSMS consumer (200).

Figure 7:
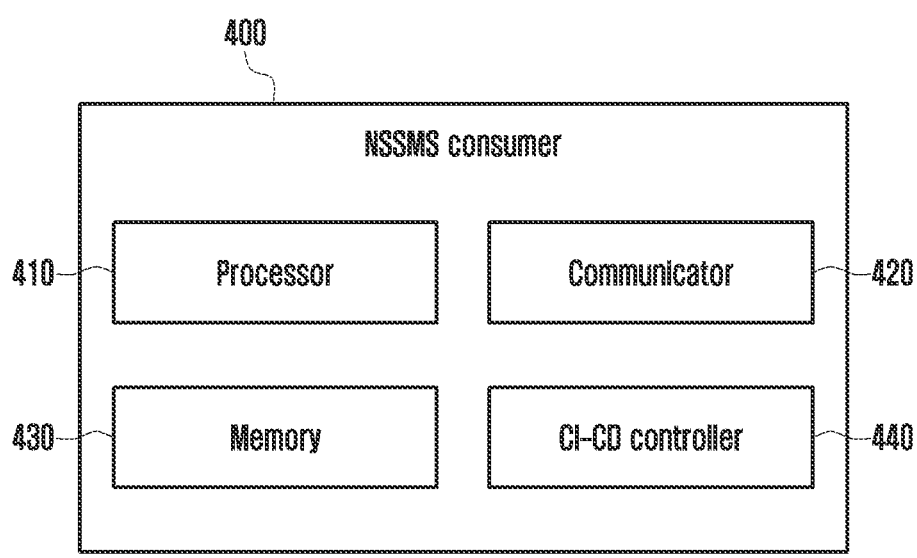
FIG. 7 shows various hardware components of a Network Slice Subnet Management Service (NSSMS) consumer, according to an embodiment of the disclosure.

FIG. 7 shows various hardware components of an NSSMS consumer (400), according to an embodiment of the disclosure.

Referring to FIG. 7, in an embodiment, an NSSMS consumer (400) includes a processor (410), a communicator (420), a memory (430) and a CI-CD controller (440). The processor (410) is coupled with the communicator (420), the memory (430), and the CI-CD controller (440).

The CI-CD controller (440) is configured to receive the NSSI request from the NSMS producer (300). The request includes the parameter indicated as part of the test network slice IOC. Based on the NSSI request, the CI-CD controller (440) is configured to perform NS instantiation and NF provisioning and send the NSSI response to the NSMS producer (300), where the NSSI response indicates NS instantiation and NF provisioning.

Further, the CI-CD controller (440) is configured to receive the de-allocation NSSI request from the NSMS producer (300). Based on the de-allocation NSSI request, the CI-CD controller (440) is configured to perform NS termination and NF provisioning and send the de-allocation NSSI response to the NSMS producer (300), where the NSSI response indicates NS termination and NF provisioning.

Further, the CI-CD controller (440) is configured to receive the modify NSSI request from the NSMS producer (300) and perform NS modification and NF provisioning based on the modify NSSI request. Further, the CI-CD controller (440) is configured to send the modify NSSI response to the NSMS producer (300), where the modify NSSI response indicates NS modification and NF provisioning. The modify NSSI request corresponds to a change in an operational state.

The CI-CD controller (440) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (410) is configured to execute instructions stored in the memory (430) and to perform various processes. The communicator (420) is configured for communicating internally between internal hardware components and with external devices via one or more networks. The memory (430) also stores instructions to be executed by the processor (410). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a machine learning (ML) model based controller and artificial intelligence (AI) model based controller. A function associated with the AI model may be performed through the non-volatile memory, the volatile memory, and the processor (410). The processor (410) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/or may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 7 shows various hardware components of the NSSMS consumer (400) but it is to be understood that other embodiments are not limited thereon. In other embodiments, the NSSMS consumer (400) may include less or more number of components. Further, the labels or names of the components are used only for illustrative purpose and does not limit the scope of the disclosure. One or more components can be combined together to perform same or substantially similar function in the NSSMS consumer (400).

Figure 8:
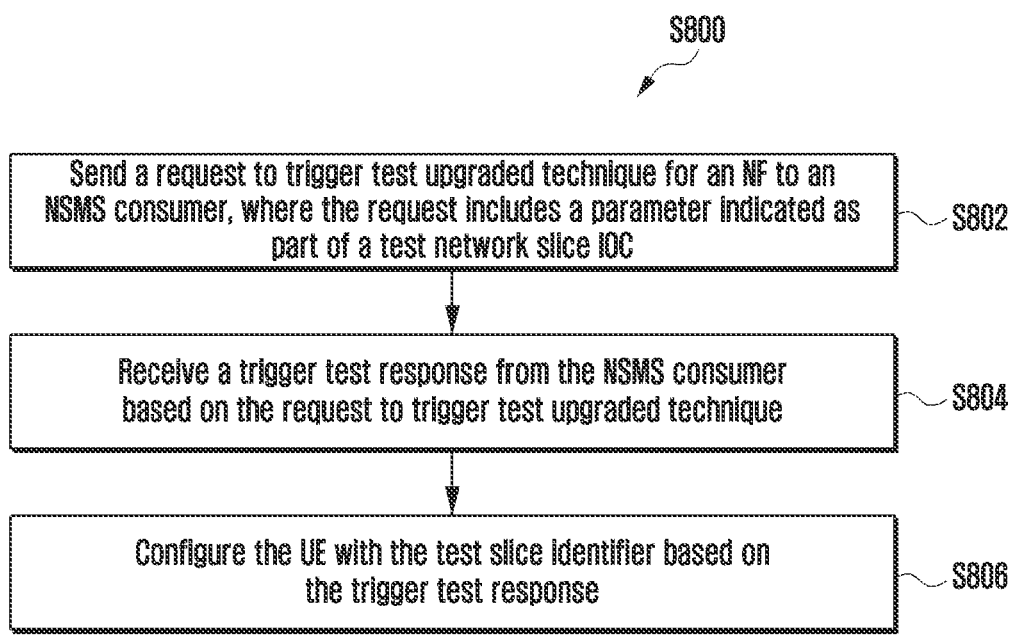
FIG. 8 is a flowchart illustrating a method, implemented by an OAM controller, for facilitating a continuous integration and continuous deployment (CI-CD) in a wireless network, according to an embodiment of the disclosure.

FIG. 8 is a flowchart illustrating a method, implemented by an OAM controller (100), for facilitating CI-CD in a wireless network, according to an embodiment of the disclosure.

The operations S802 to S806 are performed by the CI-CD controller (140).

Referring to FIG. 8 depicting flowchart (S800), at operation S802, the method includes sending a request to trigger test upgraded technique for an NF to an NSMS consumer (200). The request includes the parameter indicated as part of the test network slice IOC. The parameter includes the test slice information, the managed function information test duration, the pre-emption indicator, and the use prediction and procedures to be tested. At operation S804, the method includes receiving the trigger test response from the NSMS consumer (200) based on the request to trigger test upgraded technique. At operation S806, the method includes configuring the UE (500) with the test slice identifier based on the trigger test response.

Figure 9:
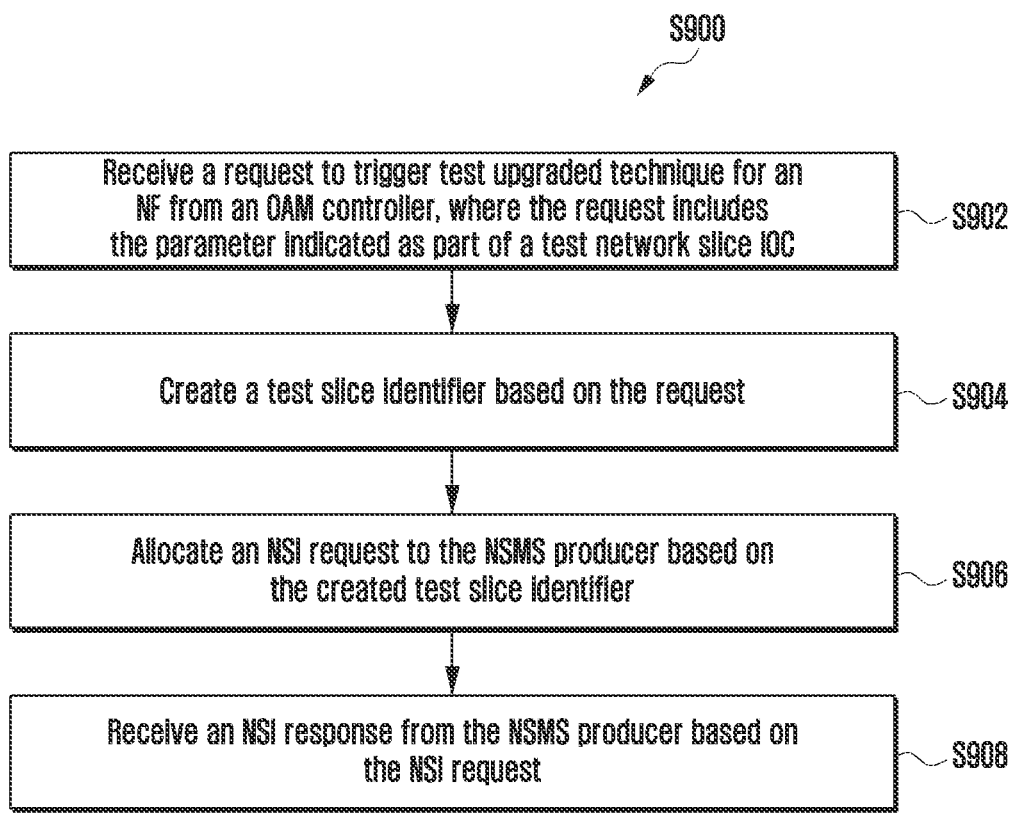
FIG. 9 is a flowchart illustrating a method, implemented by an NSMS consumer, for facilitating CI-CD in a wireless network, according to an embodiment of the disclosure.

FIG. 9 is a flowchart illustrating a method, implemented by an NSMS consumer, for facilitating CI-CD in a wireless network, according to an embodiment of the disclosure.

The operations S902 to S908 are performed by the CI-CD controller (240).

Referring to FIG. 9 depicting flowchart (S900), at operation S902, a method includes receiving a request to trigger test upgraded technique for an NF from an OAM controller (100). The request includes the parameter indicated as part of a test network slice IOC. At operation S904, the method includes creating the test slice identifier based on the request. At operation S906, the method includes allocating the NSI request to the NSMS producer (300) based on the created test slice identifier. At operation S908, the method includes receiving the NSI response from the NSMS producer (300) based on the NSI request.

Figure 10:
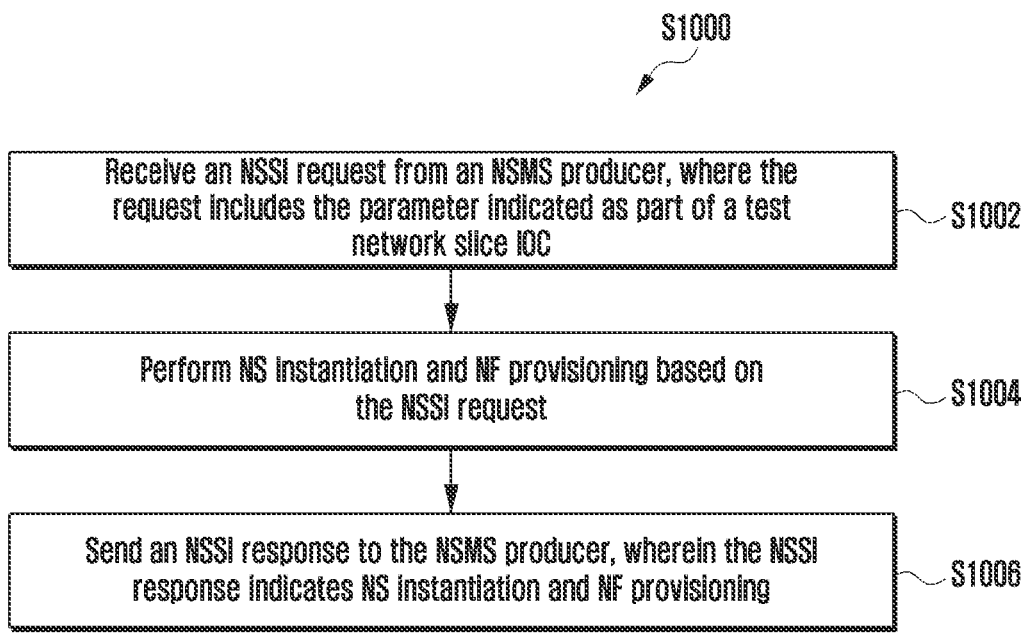
FIG. 10 is a flowchart illustrating a method, implemented by an NSSMS consumer, for facilitating CI-CD in a wireless network, according to an embodiment of the disclosure.

FIG. 10 is a flowchart illustrating a method, implemented by an NSSMS consumer, for facilitating CI-CD in a wireless network, according to an embodiment of the disclosure.

The operations S1002 and S1006 are performed by the CI-CD controller (440).

Referring to FIG. 10 depicting flowchart (S1000), at operation S1002, the method includes receiving an NSSI request from an NSMS producer (300). The request includes the parameter indicated as part of a test network slice IOC. At operation S1004, the method includes performing the NS instantiation and NF provisioning based on the NSSI request. At operation S1006, the method includes sending the NSSI response to the NSMS producer (300). The NSSI response indicates NS instantiation and NF provisioning.

Figure 11:
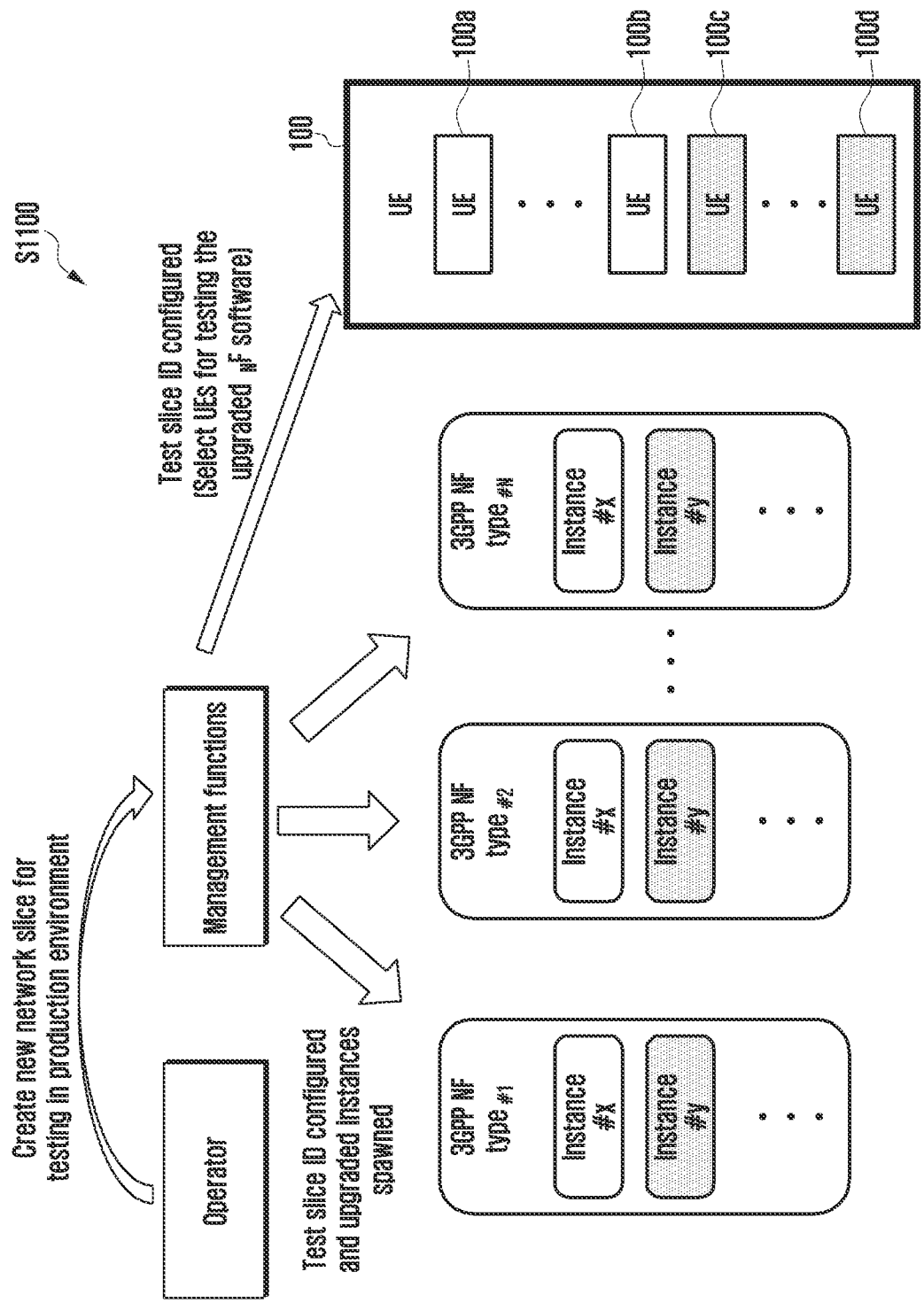
FIG. 11 depicts an overview on how a test slice with upgraded software can be deployed and only selected user equipments (UEs) are considered to be part of a new test slice, according to an embodiment of the disclosure.

FIG. 11 depicts an overview on how a test slice with upgraded software can be deployed and only selected UEs are considered to be part of a new test slice, according to an embodiment of the disclosure.

The FIG. 11, depicting overview (S1100), shows a high level flow of how network slices are created for testing in the network and in a UE (500). The grey shaded boxes indicate "New test slice for Upgraded components functioning in production environment for testing new features or bug fixes".

In an example, a drone UE can be automatically deployed based on the trigger deployment of the drone UEs configured with the new test slices created to test the upgraded software in different geographical locations. Embodiments herein select the deployment location of the upgraded software for testing. The deployment location can be selected based on the availability of radio and cloud resources, the availability of the selected UEs (e.g., UEs 100a, 100b, 100c, and 100d) and operator defined restrictions.

Figure 12:
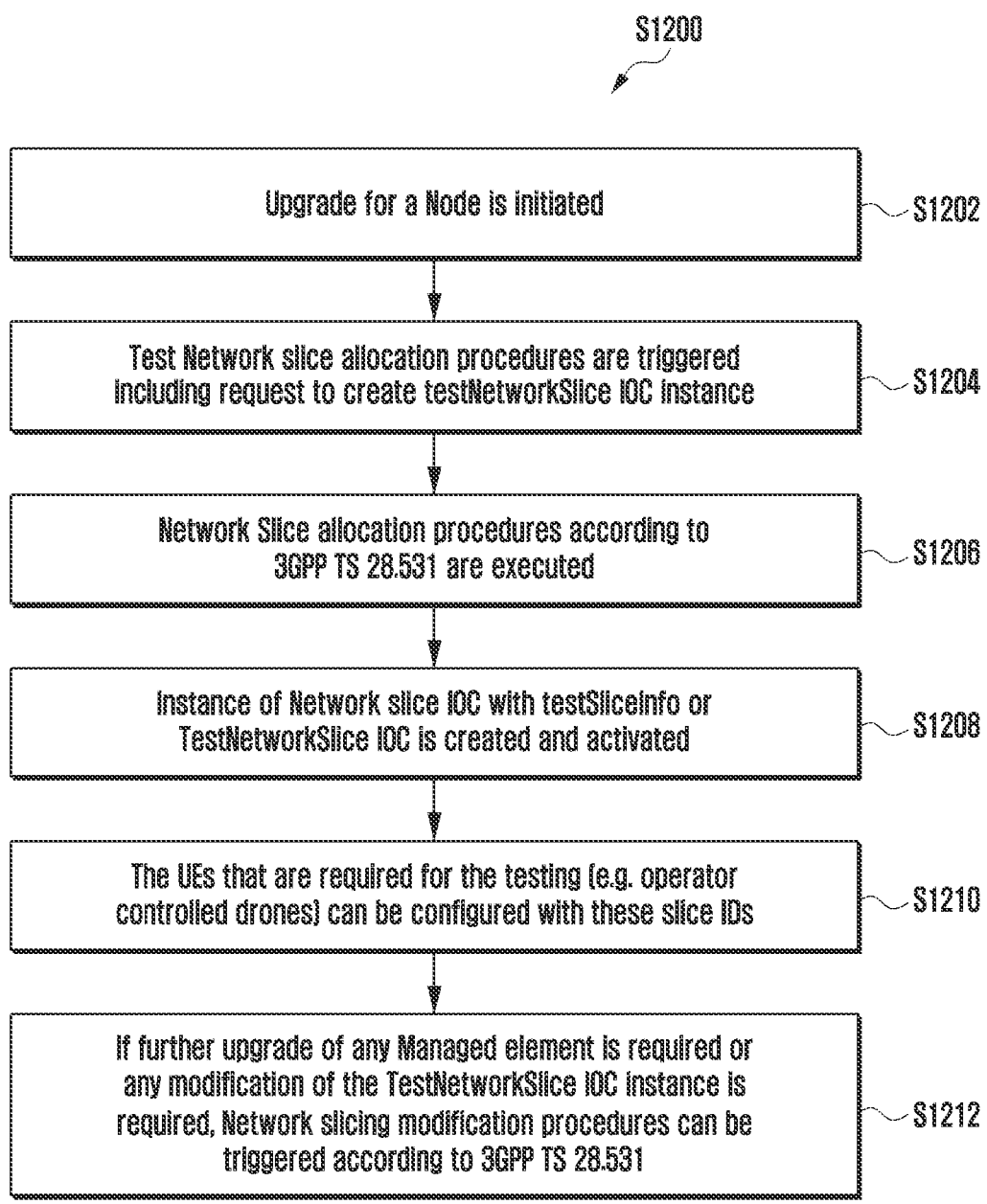
FIG. 12 is an example flowchart depicting a process of deploying a test network slice triggered by an OAM controller, according to an embodiment of the disclosure.

FIG. 12 is a flowchart depicting a process of deploying a test network slice triggered by an OAM controller, according to an embodiment of the disclosure.

Referring to FIG. 12 depicting flowchart (S1200), at operation 1202, an upgrade for the node is initiated. The new software package for the node is provided. At operation 1204, the test network slice allocation procedures are triggered including requests to create the testNetworkSlice IOC instance.

Option 1 (Table 1 is to use the existing NetworkSlice IOC with new testSliceInfo):

```
<NetworkSlice>
    <testSliceInfo></testSliceInfo>
    <NetworkSliceSubnet>
    </NetworkSliceSubnet>
</NetworkSlice>
```

Option 2 (Table 2 is to use new testNetworkSlice IOC):

```
<TestNetworkSlice>
    <testSliceInfo></testSliceInfo>
    <NetworkSliceSubnetRef>
    <ServiceProfileRef>
    <SliceProfileRef>
</NetworkSlice>
```

The existing slice profile and service profile can be reused for creation of the test slices. The references of existing NetworkSlice and NetworkSliceSubnet IOC can be reused. The testSliceInfo and its parameters are new additions, required in the 3GPP TS 28.541 specifications.

At operation 1206, Network Slice allocation procedures according to 3GPP TS 28.531 are executed. At operation 1208, the instance of Network slice IOC with testSliceInfo or TestNetworkSlice IOC is created and activated. At operation 1210, the UEs (500) that are required for the testing (e.g., operator controlled drones) can be configured with these slice IDs. The UEs (500) selected for testing can be:

1. Based on UE capability (Carrier aggregation, Dual connectivity capability).
2. Based on UE characteristics (Based on User Mobility (which can be determined based on UemobilityLevel)).
3. Based on UE RRC_State (which can be determined based on the UE history information stored with the operator).

If the UE with the above criteria does not exist or if there is an operator restriction not to use customer Ues, then Trigger deployment of the drone Ues configured with the new slices created to test the upgraded software in different geographical locations based on the testing location criteria.

Selection of deployment location of the test software in the field can be based on:

a. the availability of radio and cloud resources;
b. the availability of UE selected; and
c. operator defined restrictions.

At operation 1212, if further upgrade of any managed element is required or any modification of the TestNetworkSlice EOC instance is required, Network slicing modification procedures can be triggered, according to 3GPP TS 28.531. Additional Managed element can be included with new software package and new features. Parameters like coverageArea, maxNumberofConns, kPIMonitoring can be modified based on the test configuration changes, UE selection and deployment location updates.

TABLE 1

New Attributes for the existing Networkslice IOC

| Attributes | Description |
| --- | --- |
| operationalState | Existing parameter |
| administrativeState | Existing parameter |
| serviceProfileList | Existing parameter |
| networkSliceRef | Existing parameter |
| networkSliceSubnetRef | Existing parameter |
| testSliceInfo | |
| >> Managed Function Information (List) | This parameter is a list of ManagedElement that needs to be upgraded to test the new feature. List of feature IDs that needs to be activated for each ManagedElement that is upgraded. This parameter is a list of software versions for the ManagedElement to be upgraded to test the new feature. |
| >>Test duration | The slice can be deactivated after completion of this duration. 1. Total testing time (e.g. 200 hours). 2. Minimum Continuous testing period (e.g. 24 hours). |
| >> Pre-emption indicator | This parameter is a Boolean value indicating if the slice can be pre-empted and deactivated during high load scenarios and there is resource constraint. |
| >> Use Prediction | Use of AI/ML To determine the ideal timings for the test based on the scenarios to tested. To determine the location area to be tested based on Scenarios and configurations required for the testing. |
| >> Procedures to be tested | This could be list of 3GPP procedures (e.g. RRC connection setup, handover etc.). This can be used to decide the geographical location where the test slices need to be deployed and when it needs to be deployed. |

TABLE 2

New TestNetworkSlice IOC

| Attributes | Description |
|---|---|
| operationalState | Existing parameter |
| administrativeState | Existing parameter |
| serviceProfileList | Existing parameter |
| networkslice | Existing parameter |
| networkSliceSubnet | Existing parameter |
| testSliceInfo | |
| >> Managed Function Information (List) | This parameter is a list of ManagedElement that needs to be upgraded to test the new feature. List of feature IDs that needs to be activated for each ManagedElement that is upgraded. This parameter is a list of software versions for the ManagedElement to be upgraded to test the new feature. |
| >>Test duration | The slice can be deactivated after completion of this duration. 1. Total testing time (e.g. 200 hours). 2. Minimum Continuous testing period (e.g. 24 hours). |
| >> Pre-emption indicator | This parameter is a Boolean value indicating if the slice can be pre-empted and deactivated during high load scenarios and there is resource constraint. |
| >> Use Prediction | Use of AI/ML To determine the ideal timings for the test based on the scenarios to tested. To determine the location area to be tested based on Scenarios and configurations required for the testing. |
| >> Procedures to be tested | This could be list of 3GPP procedures (e.g. RRC connection setup, handover etc.). This can be used to decide the geographical location where the test slices need to be deployed and when it needs to be deployed. |

The various actions, acts, blocks, steps, operations, or the like in the flow charts (S800-S1000 and S1200) may be performed in the order presented, in a different order or simultaneously. Further, in some embodiments, some of the actions, acts, blocks, steps, operations, or the like may be omitted, added, modified, skipped, or the like without departing from the scope of the disclosure.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an operation, administration and maintenance (OAM) controller for facilitating continuous integration and continuous deployment (CI-CD) in a wireless communication system, the method comprising:
   transmitting, to a network slice management service (NSMS) consumer, a request to trigger a test upgrade procedure for a network function (NF), wherein the request to trigger the test upgrade procedure comprises at least one parameter indicated as part of a test network slice information object class (IOC), wherein the at least one parameter includes information on a test slice, a list of versions for a managed element, test duration, and procedures to be tested;
   receiving, from the NSMS consumer, a trigger test response based on the request to trigger the test upgrade procedure;
   determining a target location for the test upgrade procedure; and
   configuring at least one user equipment (UE) in the target location, with at least one test slice identifier based on the trigger test response.

2. The method of claim 1,
   wherein the request to trigger the test upgrade procedure is based on a UE capability required for a testing at least one feature, a UE characteristic, and a trigger deployment of the at least one UE configured with a test slice created to test an OAM technique in at least one geographical location, and
   wherein the request to trigger the test upgrade procedure is used for testing purpose in a fifth generation (5G) slice network resource model (NRM).

3. The method of claim 1,
   wherein the at least one UE is configured with the at least one test slice identifier based on an availability of radio and cloud resources, availability of the at least one UE, and an operator defined restriction, and
   wherein the at least one UE in the target location, is selected based on a load condition of at least one network node, a UE characteristic, and a UE capability.

4. The method of claim 1, further comprising:
   transmitting, to the NSMS consumer, a request to stop the test upgrade procedure;
   receiving, from the NSMS consumer, a stop test response based on the request to stop the test upgrade procedure; and
   reconfiguring the at least one UE to remove the at least one test slice identifier.

5. The method of claim 1, further comprising:
   transmitting, to the NSMS consumer, a request to modify a test configuration, wherein the request to modify the test configuration comprises the at least one parameter indicated as part of the test network slice IOC, and the at least one parameter further includes a new NF to be upgraded, new features to be tested, update test parameters and an update deployment location;
   receiving, from the NSMS consumer, a modify test response based on the request to modify the test configuration; and
   reconfiguring the at least one UE to remove or add the at least one test slice identifier based on the modify test response.

6. A method performed by a network slice management service (NSMS) consumer, for facilitating continuous integration and continuous deployment (CI-CD) in a wireless communication system, the method comprising:
   receiving, from an operation, administration and maintenance (OAM) controller, a request to trigger a test upgrade procedure for a network function (NF), wherein the request to trigger the test upgrade procedure comprises at least one parameter indicated as part of a test network slice information object class (IOC), wherein the at least one parameter includes information on a test slice, a list of versions for a managed element, test duration, and procedures to be tested;

generating at least one test slice identifier based on the request to trigger the test upgrade procedure;

determining a target location for the test upgrade procedure; and transmitting, to the OAM controller, a trigger test response including the at least one test slice identifier based on the request to trigger the test upgrade procedure, wherein at least one user equipment (UE) in the target location is configured for the test upgrade procedure based on the at least one test slice identifier.

7. The method of claim 6,
wherein the request to trigger the test upgrade procedure is based on a UE capability required for a testing at least one feature, a UE characteristic, and a trigger deployment of the at least one UE configured with a test slice created to test an OAM technique in at least one geographical location, and wherein the request to trigger the test upgrade procedure is used for testing purpose in a fifth generation (5G) slice network resource model (NRM).

8. The method of claim 6,
wherein the at least one UE is configured with the at least one test slice identifier based on an availability of radio and cloud resources, availability of the at least one UE, and an operator defined restriction, wherein the at least one UE is selected based on a load condition of at least one network node, a UE characteristic, and a UE capability, and wherein the at least one UE is configured in a target location for the test upgrade procedure which is determined by the OAM controller.

9. The method of claim 6, further comprising:
receiving, from the OAM controller, a request to stop the test upgrade procedure;
triggering an NSI de-allocating based on the test duration; and
transmitting, to the OAM controller, a stop test response based on the request to stop the test upgrade procedure, wherein the at least one UE is reconfigured to remove the at least one test slice identifier.

10. The method of claim 6, further comprising:
receiving, from the OAM controller, a request to modify a test configuration, wherein the request to modify the test configuration comprises the at least one parameter indicated as part of the test network slice IOC, and the at least one parameter further includes a new NF to be upgraded, new features to be tested, update test parameters and an update deployment location; and
transmitting, to the OAM controller, a modify test response based on the request to modify the test configuration, wherein the at least one UE is reconfigured to remove or add the at least one test slice identifier based on the modify test response.

11. An operation, administration and maintenance (OAM) controller for facilitating continuous integration and continuous deployment (CI-CD) in a wireless communication system, the OAM controller comprising:
a transceiver;
memory including one or more storage media, storing instructions; and at least one processor including processing circuitry,
wherein the instructions, when executed by the at least one processor individually or collectively, cause the OAM controller to:
transmit, to a network slice management service (NSMS) consumer via the transceiver, a request to trigger a test upgrade procedure for a network function (NF), wherein the request to trigger the test upgrade procedure comprises at least one parameter indicated as part of a test network slice information object class (IOC), wherein the at least one parameter includes information on a test slice, a list of versions for a managed element, test duration, and procedures to be tested, receive, from the NSMS consumer via the transceiver, a trigger test response based on the request to trigger the test upgrade procedure, determine a target location for the test upgrade procedure, and configure at least one user equipment (UE) in the target location, with at least one test slice identifier based on the trigger test response.

12. The OAM controller of claim 11,
wherein the request to trigger the test upgrade procedure is based on a UE capability required for a testing at least one feature, a UE characteristic, or a trigger deployment of the at least one UE configured with a test slice created to test an OAM technique in at least one geographical location, and wherein the request to trigger the test upgrade procedure is used for testing purpose in a fifth generation (5G) slice network resource model (NRM).

13. The OAM controller of claim 11,
wherein the at least one UE is configured with the at least one test slice identifier based on an availability of radio and cloud resources, availability of the at least one UE, and an operator defined restriction, and wherein the at least one UE in the target location, is selected based on a load condition of at least one network node, a UE characteristic, and a UE capability.

14. The OAM controller of claim 11, wherein the instructions, when executed by the at least one processor individually or collectively, further cause the OAM controller to:
transmit, to the NSMS consumer via the transceiver, a request to stop the test upgrade procedure,
receive, from the NSMS consumer via the transceiver, a stop test response based on the request to stop the test upgrade procedure, and
reconfigure the at least one UE to remove the at least one test slice identifier.

15. The OAM controller of claim 11, wherein the instructions, when executed by the at least one processor individually or collectively, further cause the OAM controller to:
transmit, to the NSMS consumer via the transceiver, a request to modify a test configuration, wherein the request to modify the test configuration comprises the at least one parameter indicated as part of the test network slice IOC, and the at least one parameter further includes a new NF to be upgraded, new features to be tested, update test parameters and an update deployment location,
receive, from the NSMS consumer via the transceiver, a modify test response based on the request to modify the test configuration, and
reconfigure the at least one UE to remove or add the at least one test slice identifier based on the modify test response.

16. A network slice management service (NSMS) consumer, for facilitating continuous integration and continuous deployment (CI-CD) in a wireless communication system, the NSMS consumer comprising:
- a transceiver;
- memory including one or more storage media, storing instructions; and
- at least one processor including processing circuitry,
- wherein the instructions, when executed by the at least one processor individually or collectively, cause the NSMS consumer to:
- receive, from an operation, administration and maintenance (OAM) controller via the transceiver, a request to trigger a test upgrade procedure for a network function (NF), wherein the request to trigger the test upgrade procedure comprises at least one parameter indicated as part of a test network slice information object class (IOC), wherein the at least one parameter includes information on a test slice, a list of versions for a managed element, test duration, and procedures to be tested,
- generate at least one test slice identifier based on the request to trigger the test upgrade procedure,
- determine a target location for the test upgrade procedure, and
- transmit, to the OAM controller via the transceiver, a trigger test response including the at least one test slice identifier based on the request to trigger the test upgrade procedure, wherein at least one user equipment (UE) in the target location is configured for the test upgrade procedure based on the at least one test slice identifier.

17. The NSMS consumer of claim 16,
wherein the request to trigger the test upgrade procedure is based on a UE capability required for a testing at least one feature, a UE characteristic, and a trigger deployment of the at least one UE configured with a test slice created to test an OAM technique in at least one geographical location, and
wherein the request to trigger the test upgrade procedure is used for testing purpose in a fifth generation (5G) slice network resource model (NRM).

18. The NSMS consumer of claim 16,
wherein the at least one UE is configured with the at least one test slice identifier based on an availability of radio and cloud resources, availability of the at least one UE, and an operator defined restriction,
wherein the at least one UE is selected based on a load condition of at least one network node, a UE characteristic, and a UE capability, and
wherein the at least one UE is configured in a target location for the test upgrade procedure which is determined by the OAM controller.

19. The NSMS consumer of claim 16, wherein the instructions, when executed by the at least one processor individually or collectively, cause the NSMS consumer to:
- receive, from the OAM controller via the transceiver, a request to stop the test upgrade procedure,
- trigger an NSI de-allocating based on a test duration, and
- transmit, to the OAM controller, a stop test response based on the request to stop the test upgrade procedure, wherein the at least one UE is reconfigured to remove the at least one test slice identifier.

20. The NSMS consumer of claim 16, wherein the instructions, when executed by the at least one processor individually or collectively, cause the NSMS consumer to:
- receive, from the OAM controller via the transceiver, a request to modify a test configuration, wherein the request to modify the test configuration comprises the at least one parameter indicated as part of the test network slice IOC, and the at least one parameter further includes a new NF to be upgraded, new features to be tested, update test parameters and an update deployment location, and
- transmit, to the OAM controller via the transceiver, a modify test response based on the request to modify the test configuration, wherein the at least one UE is reconfigured to remove or add the at least one test slice identifier based on the modify test response.

* * * * *